US011784762B2

(12) United States Patent
Jayaramachar et al.

(10) Patent No.: US 11,784,762 B2
(45) Date of Patent: Oct. 10, 2023

(54) METHODS, SYSTEMS, AND COMPUTER READABLE MEDIA FOR LIMITING NETWORK FUNCTION (NF) REPOSITORY FUNCTION (NRF) FORWARDING

(71) Applicant: Oracle International Corporation, Redwood Shores, CA (US)

(72) Inventors: Amarnath Jayaramachar, Bangalore (IN); Yesh Goel, Bangalore (IN); Doki Satish Kumar Patro, Bangalore (IN); Sridhar Karuturi, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/524,703

(22) Filed: Nov. 11, 2021

(65) Prior Publication Data

US 2023/0143400 A1    May 11, 2023

(51) Int. Cl.
*H04L 1/1867* (2023.01)
*H04L 45/00* (2022.01)
*H04W 48/16* (2009.01)
*H04W 48/06* (2009.01)

(52) U.S. Cl.
CPC ............ *H04L 1/1867* (2013.01); *H04L 45/20* (2013.01); *H04W 48/06* (2013.01)

(58) Field of Classification Search
CPC ....................................................... H04L 45/20
See application file for complete search history.

(56) References Cited

U.S. PATENT DOCUMENTS

| | | | | |
|---|---|---|---|---|
| 2008/0137830 | A1* | 6/2008 | Bhogal | H04L 67/63 379/201.04 |
| 2012/0163165 | A1* | 6/2012 | Ra | H04L 45/50 370/235 |
| 2020/0252426 | A1 | 8/2020 | Lee | |
| 2021/0083965 | A1* | 3/2021 | Taft | H04L 1/0016 |

(Continued)

FOREIGN PATENT DOCUMENTS

WO    WO 2023/101818 A1    6/2023

OTHER PUBLICATIONS

"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).

(Continued)

*Primary Examiner* — Bryan Y Lee
(74) *Attorney, Agent, or Firm* — Jenkins, Taylor & Hunt, P.A.

(57) ABSTRACT

Methods, systems, and computer readable media for limiting network function (NF) repository function (NRF) forwarding are disclosed. One example method for limiting NRF forwarding comprises: at a first NF comprising at least one processor: receiving a request message associated with a consumer NF; determining that the request message cannot be serviced by the first NF; inserting or modifying a forwarding limit value in the request message, wherein the forwarding limit value indicates a number of times that the request message can be forwarded; and forwarding the request message including the forwarding limit value toward a second NF.

16 Claims, 8 Drawing Sheets

(56) References Cited

U.S. PATENT DOCUMENTS

2021/0281567 A1* 9/2021 Arai ............... H04L 63/105
2023/0171182 A1 6/2023 Goel et al.

OTHER PUBLICATIONS

"3rd Generation Partnership Project; Technical Specification Group Core Network and Terminals; 5G System; Network Function Repository Services; Stage 3 (Release 17)," 3GPP TS. 29.510, V17.2.0, pp. 1-256 (Jun. 2021).

"3rd Generation Partnership Project; Technical Specification Group Core Network and Terminals; 5G System; Technical Realization of Service Based Architecture; Stage 3 (Release 17)," 3GPP TS 29.500, V17.3.0, pp. 1-108 (Jun. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.1.0, pp. 1-102 (Jun. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"5G; 5G System; Technical Realization of Service Based Architecture; Stage 3 (3GPP TS 29.500 version 16.5.0 Release 16)," ETSI TS 129 500, V16.5.0, pp. 1-86 (Nov. 2020).

Commonly-Assigned, co-pending U.S. Appl. No. 17/539,724 for "Methods, Systems, and Computer Readable Media for Restricting a Number of Hops Conducted in a Communications Network," (Unpublished, Dec. 1, 2021).

Nappa, et al., "RevProbe: Detecting Silent Reverse Proxies in Malicious Server Infrastructures", ASAC, pp. 101-112 (2016).

"3rd Generation Partnership Project; Technical Specification Group Core Network and Terminals; 5G System; Technical Realization of Service Based Architecture; Stage 3 (Release 17)" 3GPP TS 29.500, V17.1.0 (Dec. 2020).

Notification of the Transmittal of the International Search Report and Written Opinion of the International Searching Authority, or the Declaration for International Patent Application No. PCT/US2022/050170 (dated Apr. 28, 2023).

* cited by examiner

700

| CONFIGURATION/ OPERATIONAL MODE | LOOKUP/MATCH KEY | FORWARDING LIMIT (FWD-LIMIT) VALUE |
|---|---|---|
| SYSTEM WIDE | * | 5 |
| NF TYPE BASED | AF | 3 |
| NF TYPE BASED | NEF | 2 |
| NF INSTANCE BASED | NF ID 1 | 1 |
| NF INSTANCE BASED | NF ID 2 | 2 |

FIG. 7

METHODS, SYSTEMS, AND COMPUTER READABLE MEDIA FOR LIMITING NETWORK FUNCTION (NF) REPOSITORY FUNCTION (NRF) FORWARDING

TECHNICAL FIELD

The subject matter described herein relates to improving network function (NF) discovery in fifth generation (5G) and subsequent generation communications networks. More particularly, the subject matter described herein relates to methods, systems, and computer readable media for limiting network function (NF) repository function (NRF) forwarding.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destined producer NF.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

SUMMARY

Methods, systems, and computer readable media for limiting network function (NF) repository function (NRF) forwarding are disclosed. One example method for limiting NRF forwarding comprises: at a first NF comprising at least one processor: receiving a request message associated with a consumer NF; determining that the request message cannot be serviced by the first NF; inserting or modifying a forwarding limit value in the request message, wherein the forwarding limit value indicates a number of times that the request message can be forwarded; and forwarding the request message including the forwarding limit value toward a second NF.

One example system for limiting NRF forwarding includes at least one processor, a memory, and a first NF implemented using the at least one processor and the memory. The first NF is configured for: receiving a request message associated with a consumer NF; determining that the request message cannot be serviced by the first NF; inserting or modifying a forwarding limit value in the request message, wherein the forwarding limit value indicates a number of times that the request message can be forwarded; and forwarding the request message including the forwarding limit value toward a second NF.

One example non-transitory computer readable medium comprising computer executable instructions embodied in the non-transitory computer readable medium that when executed by at least one processor of at least one computer cause the at least one computer to perform steps comprising: at a first NF comprising at least one processor: receiving a request message associated with a consumer NF; determining that the request message cannot be serviced by the first NF; inserting or modifying a forwarding limit value in the request message, wherein the forwarding limit value indicates a number of times that the request message can be forwarded; and forwarding the request message including the forwarding limit value toward a second NF.

In some embodiments, the first NF may include a service communications proxy (SCP) (e.g., a visited or home SCP) or a NRF (e.g., a visited or home NRF).

In some embodiments, the second NF may include a visited NRF or a home NRF.

In some embodiments, the request message may include an Nnrf service request, a service-based interface (SBI) request, an NF discovery request, an NF subscription request, or an NF access token request.

In some embodiments, the second NF may be configured for receiving the request message including the forwarding limit value; determining that the request message cannot be serviced by the second NF; determining, using the forwarding limit value, that the request message can be forwarded; decrementing by one the forwarding limit value in the request message; and forwarding the request message with the forwarding limit value toward a third NF.

In some embodiments, the third NF may be configured for receiving the request message including the forwarding limit value; determining that the request message cannot be serviced by the third NF; determining, using the forwarding limit value, that the request message cannot be forwarded; generating a response message indicating an error or a failure; and sending the response message.

In some embodiments, determining that the request message cannot be forwarded may include determining that the forwarding limit value is zero or that the forwarding limit value indicates that the request message cannot be forwarded.

In some embodiments, the forwarding limit value may be in a header of the request message, in a payload of the request message, in a hypertext transfer protocol (HTTP) header of the request message, or in an information element (IE) in a payload of the request message.

In some embodiments, inserting the forwarding limit value in the request message may comprise determining that the request message lacks the forwarding limit value; determining, using a data store containing forwarding limit operational modes and corresponding predetermined forwarding limit values, a predetermined forwarding limit value; and inserting, in the request message, the predetermined forwarding limit value or the predetermined forwarding limit value decremented by one.

In some embodiments, the forwarding limit operational modes may include a system wide forwarding limit mode, an NF type based forwarding limit mode, or an NF instance based forwarding limit mode.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 7 depicts example forwarding limit data usable for determining a default or initial forwarding limit value.

DETAILED DESCRIPTION

Figure 1:
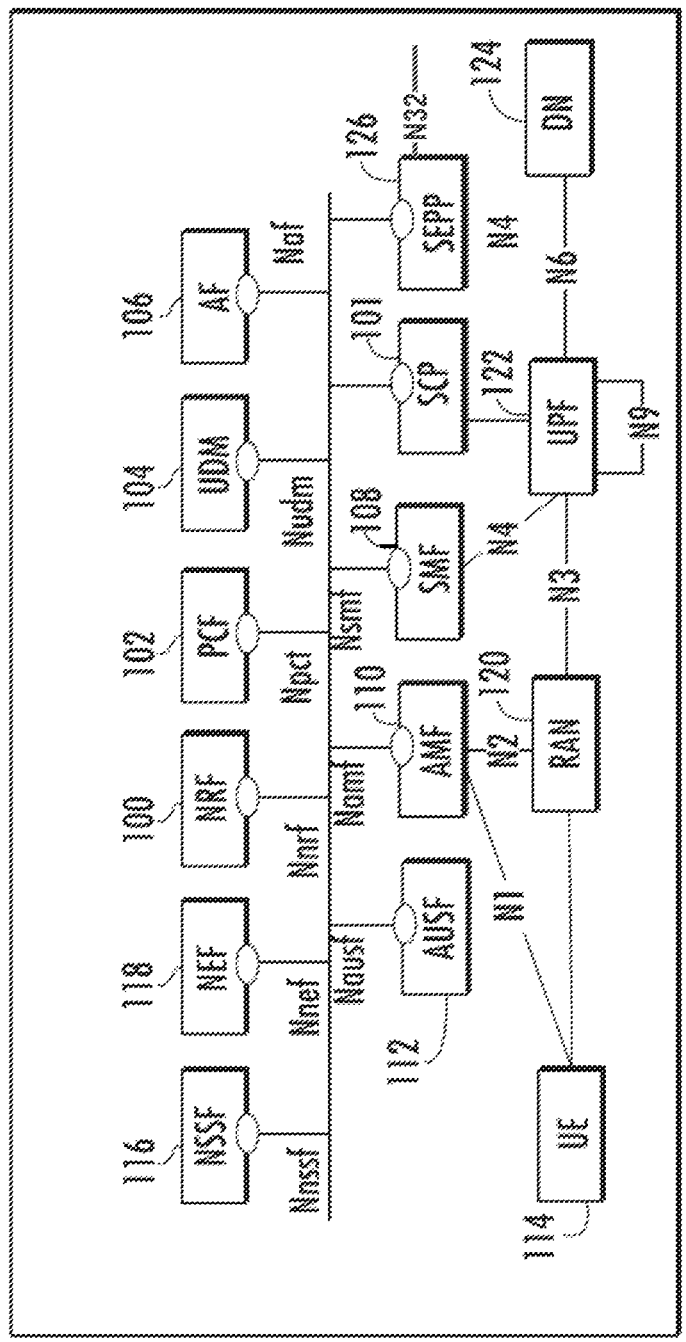
FIG. 1 is a network diagram illustrating an example fifth generation (5G) network architecture.

The subject matter described herein relates to methods, systems, and computer readable media for limiting network function (NF) repository function (NRF) forwarding. In fifth generation (5G) networks and/or other communications networks, a network or a public land mobile network (PLMN) may be logically separated into regions. For example, each region may include multiple geo-redundant NRFs that share state information and configuration data, e.g., via one or more data synchronization or replication mechanisms. The geo-redundant NRFs in a given region may be independent from geo-redundant NRFs in another region and the NRFs in the different regions may not share state information and/or may have different information. As defined in Third Generation Partnership Project (3GPP) Technical Specification (TS) 29.510, NRF supports intermediate NRF forwarding for any Nnrf service request (e.g., discovery, subscription, and access-token requests) if that NRF is unable to service the request. In such a NRF forwarding scenario, an NRF from a given region may forward a service request that cannot be serviced to another region's NRF and forwarding may continue if that region's NRF cannot service the service request. While NRF forwarding of Nnrf service requests can be useful in obtaining requested information stored in a remote or different region, sometimes multiple forwarding events can be time consuming and, as such, a transaction timeout (e.g., a request timeout) may occur before a response message is received. Hence, if a transaction timeout occurs before a response message is received, then the requester may reject, discard, or ignore the late or stale response message regardless of its content. Hence, various issues (e.g., network errors and/or service disruptions) may result if NRF forwarding is not limited to avoid a late or stale response, e.g., a response received after a transaction timeout.

In accordance with some aspects of the subject matter described herein, methods, systems, mechanisms, and/or techniques for limiting NRF forwarding are provided. In some embodiments, one or more NFs (e.g., NRFs or service communications proxies (SCPs)) in accordance with various aspects described herein may be configured to support and utilize a forwarding limit value (e.g., as a header parameter or a payload information element (IE)) for indicating how many times (if any) a request message can be forwarded, e.g., to an NRF. In such embodiments, if a received request message does not include a forwarding limit value, the NF may insert a default or predetermined forwarding limit value before forwarding the request message onward. In such embodiments, if the received request message already includes a forwarding limit value, the NF may decrement by one the existing forwarding limit value in the request message before forwarding the request message onward. In some embodiments, once the forwarding limit value is zero or otherwise indicates that further intermediate NRF forwarding is not allowed, a receiving NRF may determine whether the request message can be serviced or not. If the NRF is not eligible to service the request, then the NRF must respond with an appropriate error (instead of further forwarding of the request message). After receiving the response indicating the error, a consumer NF may retry or reroute the request message based on an operator policy. Advantageously, by utilizing one or more techniques and/or methods described herein, NRF forwarding can be controlled or limited, thereby reducing late or stale responses and/or mitigating various issues.

In accordance with some aspects of the subject matter described herein, various NFs may be configured for supporting or regulating NRF forwarding limits. For example, in addition to NRFs, SCPs may be capable of supporting NRF forwarding limits by inserting forwarding limit values in service requests and/or decrementing the forwarding limit values in service requests, e.g., when the service requests are forwarded onward, e.g., to an NRF.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communications proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC requests) between a consumer NF and a producer NF after applying application level security protection.

Various scenarios exist where NRF forwarding (e.g., forwarding a request message from one NRF 100 to another NRF 100) of Nnrf service requests (e.g., discovery, subscriptions, access tokens) may be used. For example, e.g., as described in TS 29.510 section 5.2.2.5.4, when multiple NRFs 100 are deployed in one PLMN, a consumer NF instance can subscribe to changes of NF Instances registered in an NRF 100 to which the consumer NF instance is not directly interacting. In this example, the subscription message may be forwarded by an intermediate NRF to which the subscribing NF instance is directly interacting. In another example, as described in TS 29.510 section 5.3.2.2.5, when multiple NRFs 100 are deployed in one PLMN, one NRF 100 may query the "nf-instances" resource in a different NRF 100 so as to fulfil a service discovery request from a consumer NF. In this example, the query between these two NRFs 100 may be forwarded by a third NRF 100. In another example, as described in TS 29.510 section 5.3.2.2.5, when multiple NRFs 100 are deployed in one PLMN, one NRF 100 may request an OAuth2 access token from a different NRF 100 so as to fulfil an access token request from a consumer NF. In this example, the access token request between these two NRFs 100 may be forwarded by a third NRF 100.

As indicated above, TS 29.510 indicates various scenarios where Nnrf service requests (e.g., discovery, subscription and/or access-token requests) can be eligible for forwarding. While NRF forwarding of Nnrf service requests can be useful in obtaining requested information stored in different NRFs 100, sometimes multiple forwarding events can be time consuming and, as such, a transaction timeout may occur before a response message is received. In other words, without a forwarding limit for service requests, a transaction timeout (e.g., a request timeout) from the request originator may occur causing a service impact. However, as described in various aspects herein, by supporting a forwarding limit (e.g., regulating the number of hops at the application level via a decrementing value in the service request), various issues associated with unregulated NRF forwarding are mitigated.

It will be appreciated that FIG. 1 is for illustrative purposes and that various nodes and/or modules, locations, and/or functionality described above in relation to FIG. 1 may be changed, altered, added, or removed.

Figure 2:
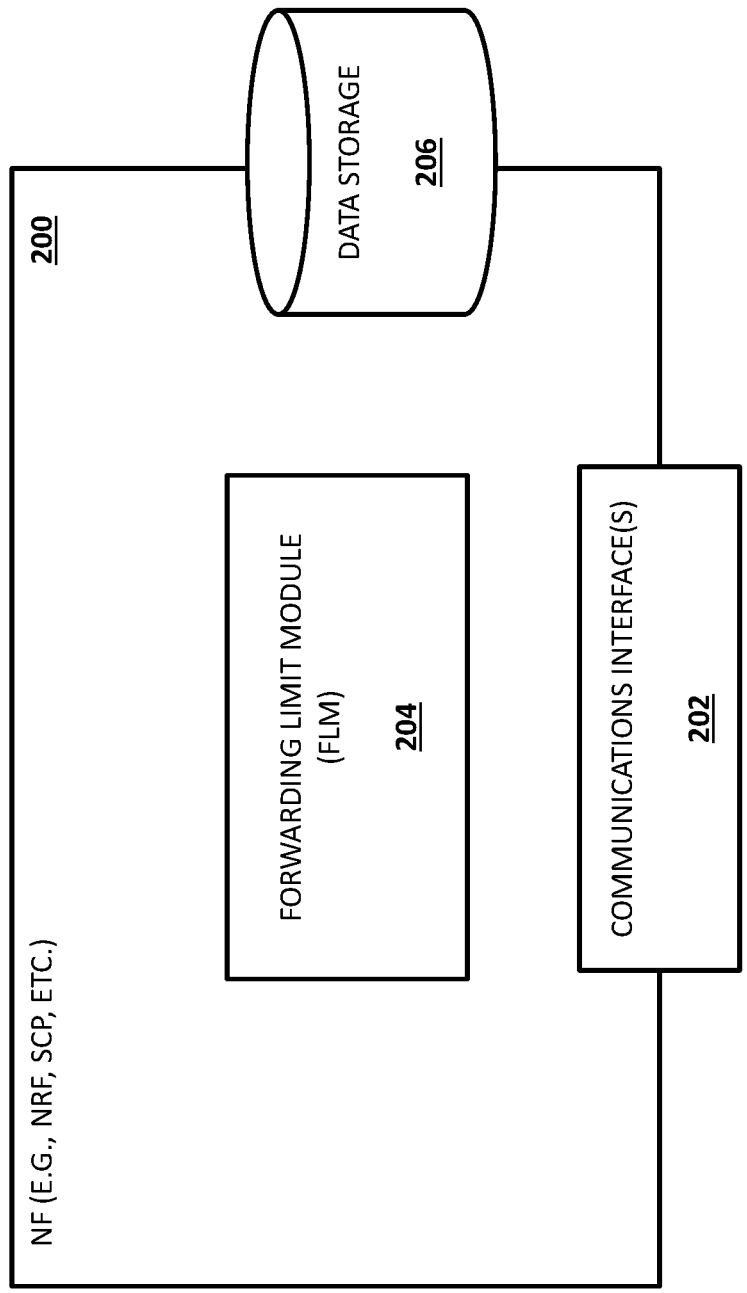
FIG. 2 is a block diagram illustrating an example network function (NF) for supporting NRF forwarding limits.

FIG. 2 is a diagram illustrating an example NF 200 for supporting NRF forwarding limits. NF 200 may represent any suitable entity or entities (e.g., one or more node(s), device(s), or computing platform(s)) for performing various aspects or functionalities, e.g., operations associated with generating, obtaining, inserting, modifying, or using forwarding limit values in request messages. In some embodiments, NF 200 may represent or include one or more 5GC NFs, e.g., NRF 100 or SCP 101. In some embodiments, NF 200 may include an authorization server, a data repository, a network gateway, a network proxy, an edge security device, or other functionality.

In some embodiments, NF 200 or a related module therein (e.g., a forwarding limit module (FLM) 204) may be configured (e.g., via programming logic) for supporting and/or enforcing NRF forwarding limits. For example, prior to forwarding a received request message (e.g., an Nnrf service request) to NRF 100, NF 200 may be configured to inspect the request message for a forwarding limit value in a header or payload portion of the message and determining whether the request message can be forwarded to NRF 100. In this example, if the forwarding limit value indicates that NRF forwarding is allowed, NF 200 may forward the request message and, if the forwarding limit value indicates that NRF forwarding is not allowed, NF 200 may generate a response indicating an error or failure, e.g., instead of forwarding to NRF 100.

In some embodiments, NF 200 or a related module therein may be configured for generating, obtaining, inserting, or modifying a forwarding limit value. For example, NF 200 may determine that a service message (e.g., a service request) cannot be serviced and should be forwarded to an NRF 100. In such embodiments, if the received request message does not include a forwarding limit value, NF 200 may insert a default or predetermined forwarding limit value before forwarding the request message onward. For example, NF 200 may access a data store containing forwarding limit operational modes (e.g., a system wide configuration, an NF type based configuration, or an NF instance based configuration) and corresponding predetermined or default forwarding limit values. In this example, using the data store and a current forwarding limit configuration or operational mode, NF 200 may identify a default forwarding limit value and may insert the default forwarding limit value or derivation thereof (e.g., the default forwarding limit value minus one) into the request message before it is forwarded onward.

In some embodiments, NF 200 or a related module therein may be configured for receiving a request message associated with a consumer NF; determining that the request message cannot be serviced by NF 200; inserting or modifying a forwarding limit value in the request message, wherein the forwarding limit value indicates a number of times that the request message can be forwarded; and forwarding the request message including the forwarding limit value toward an NRF 100.

Referring to FIG. 2, NF 200 may include one or more communications interface(s) 202 for communicating messages via a communications environment, e.g., one or more 5G networks. For example, communications interface(s) 202 may include one or more communication interfaces for communicating with various entities in a home network (e.g., home public land mobile network (H-PLMN)) or a visited network (e.g., a visited public land mobile network (V-PLMN)).

FLM 204 may be any suitable entity (e.g., software executing on at least one processor) for supporting and/or enforcing NRF forwarding limits. For example, prior to forwarding a received request message (e.g., an Nnrf service request) to NRF 100, FLM 204 may be configured to inspect the request message for a forwarding limit value in a header or payload portion of the message and determining whether the request message can be forwarded to NRF 100. In this example, if the forwarding limit value indicates that NRF forwarding is allowed, FLM 204 or a related entity may forward the request message and, if the forwarding limit value indicates that NRF forwarding is not allowed, NF 200 may generate a response indicating an error or failure, e.g., instead of forwarding to NRF 100.

In some embodiments, FLM 204 may be configured for generating, obtaining, inserting, or modifying a forwarding limit value. For example, FLM 204 may determine that a service message (e.g., a service request) cannot be serviced and should be forwarded to NRF 100. In such embodiments, if the received request message does not include a forwarding limit value, FLM 204 may insert a default or predetermined forwarding limit value before the request message is forwarded. For example, FLM 204 may access a data store containing forwarding limit operational modes (e.g., a system wide configuration, an NF type based configuration, or an NF instance based configuration) and corresponding predetermined or default forwarding limit values. In this example, using the data store and a current forwarding limit configuration or operational mode, NF 200 may identify a default forwarding limit value and may insert the default forwarding limit value or derivation thereof (e.g., the default forwarding limit value minus one) into the request message before it is forwarded onward.

In some embodiments, FLM 204 may be configured for receiving a request message associated with a consumer NF; determining that the request message cannot be serviced by NF 200; inserting or modifying a forwarding limit value in the request message, wherein the forwarding limit value indicates a number of times that the request message can be forwarded; and forwarding the request message including the forwarding limit value toward NRF 100.

NF 200 and/or FLM 204 may access (e.g., read from and/or write information to) data storage 206. Data storage 206 may be any suitable entity (e.g., a computer readable medium or memory) for storing various data. In some embodiments, data storage 206 may include forwarding limit information usable for identifying default or predetermined forwarding limit values. For example, data store 206 may include data records or entries indicating associations between NRF operational modes or configurations and corresponding default forwarding limit values. In some embodiments, data storage 206 may include logic for performing various aspects of receiving, processing, forwarding, and/or responding to various Nnrf service requests or other messages.

It will be appreciated that FIG. 2 and its related description are for illustrative purposes and that NF 200 may include additional and/or different modules, components, or functionality.

Figure 3:
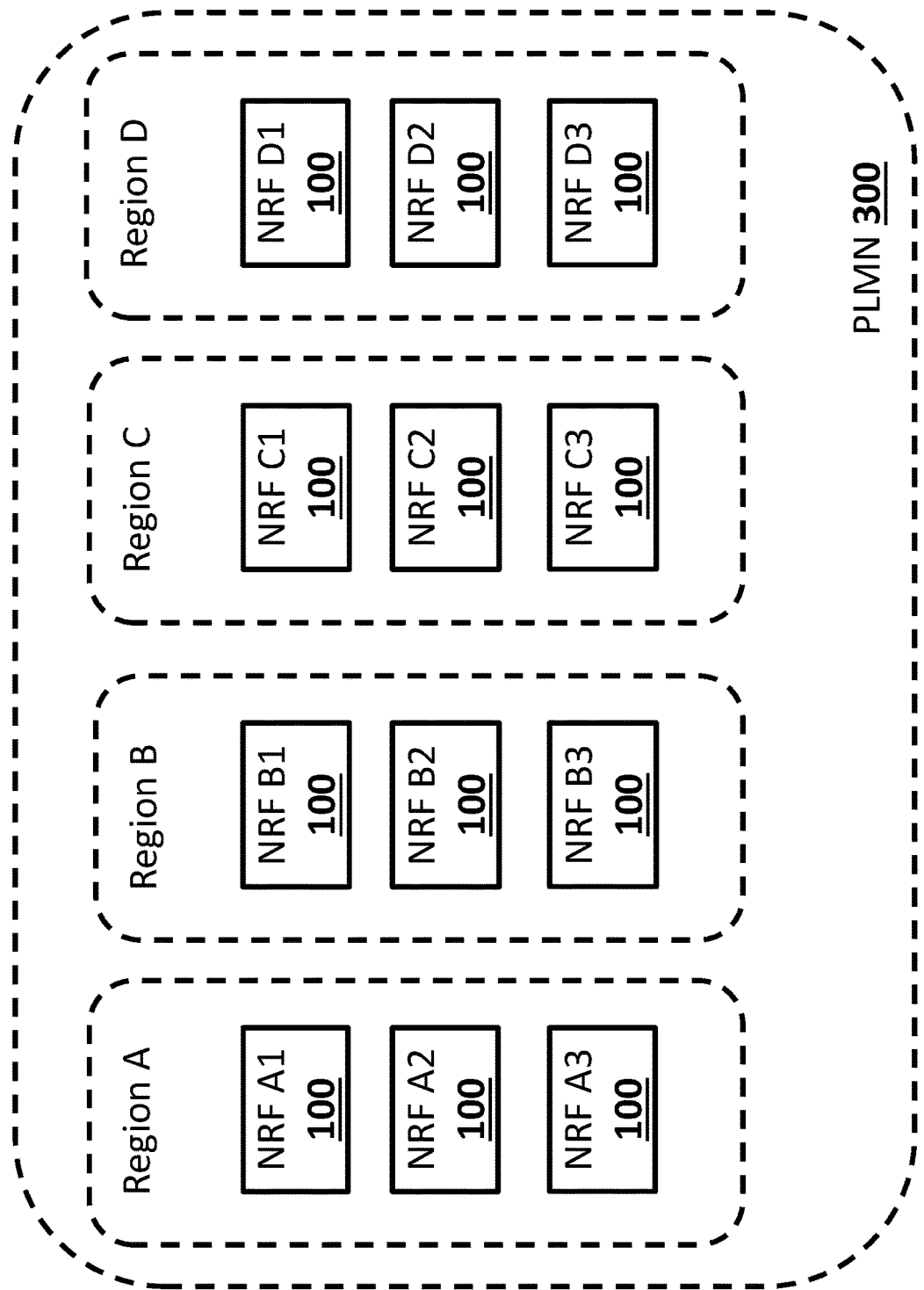
FIG. 3 is a network diagram illustrating regions of a public land mobile network (PLMN)

FIG. 3 is a network diagram illustrating regions of a PLMN 300. PLMN 300 may represent a network (e.g., a network comprising a 5GC network) and may be the home network or a visited network of one or more UEs 114. In some embodiments, PLMN 300 may include four regions, regions A-D. Each region may include a group or set of 5GC NFs, e.g., NRFs, SCPs, etc. In some embodiments, a region may include multiple instances of a given type of NFs. For example, a region may include a primary and one or more secondary NRFs 100, where each of the NRFs 100 have access to the same data and/or synchronize data. In another example, a region may include geo-redundant NRFs 100 located in various physical locations. In this example, the geo-redundant NRFs 100 in a given region may share state information and configuration data, e.g., via one or more data synchronization or replication mechanisms. Continuing with this example, the geo-redundant NRFs 100 in a given region may be independent from geo-redundant NRFs 100 in another region and, as such, the NRFs 100 in the different regions may not share state information and/or may store or have access to different information, e.g., NF profiles.

Referring to FIG. 3, PLMN 300 may support triple-site redundancy, where each region include three geo-redundant NRFs 100 that share NF profiles and other data via one or more data synchronization or replication mechanisms. For example, region A includes NRF A1 100, NRF A2 100, and NRF A3 100; region B includes NRF B1 100, NRF B2 100, and NRF B3 100; region C includes NRF C1 100, NRF C2 100, and NRF C3 100; and region D includes NRF D1 100, NRF D2 100, and NRF D3 100.

In some embodiments, for any Nnrf service request from a consumer NF, an NRF 100 (e.g., NRF A1 100) from a given region shall forward to another region NRF 100 (e.g., NRF B1 100) if that specific request message cannot be serviced. In such embodiments, unless NRF forwarding is limited or managed (e.g., by decrementing a forwarding limit value by one for each forwarding event and stopping when the forwarding limit value is zero), the request message may continue to be forwarded to a different region in PLMN 300 unless the request message can be serviced by the current NRF 100 or until an NRF 100 in all the regions has received the request message.

It will be appreciated that FIG. 3 and its related description are for illustrative purposes and PLMN 300 may include additional and/or different regions, NFs, modules, components, or functionality. For example, in some embodiments, PLMN 300 may have two regions with five geo-redundant NRFs 100 and three geo-redundant SCPs 101.

Figure 4:
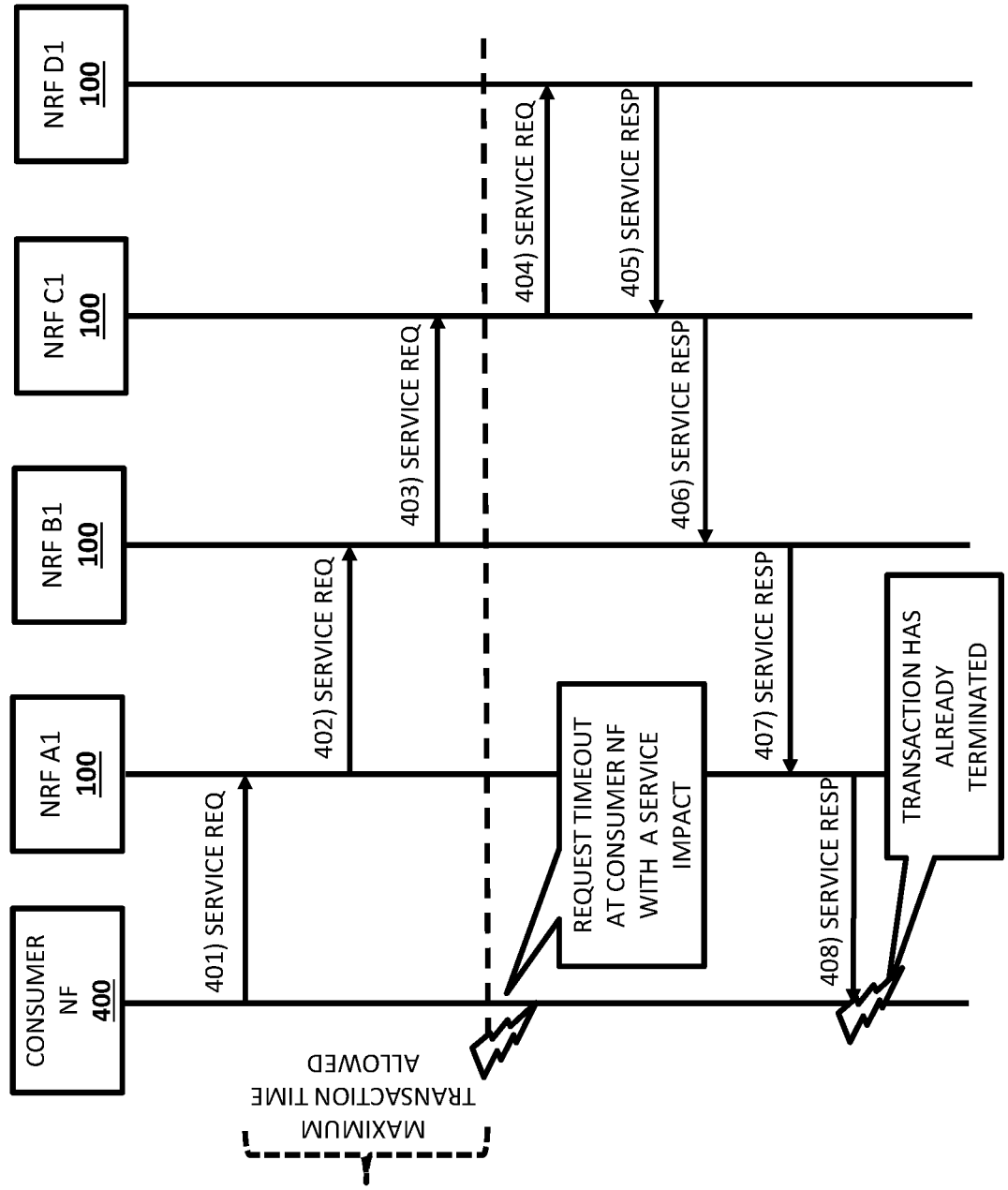
FIG. 4 is a message flow diagram illustrating a scenario involving a request message being forwarded to multiple NF repository functions (NRFs)

FIG. 4 is a message flow diagram illustrating a scenario involving a request message being forwarded to multiple NRFs 100. In some embodiments, a PMLN (e.g., PLMN 300) or NRFs 100 therein may not support or regulate NRF forwarding limits. In such embodiments, a service request may be forwarded from one NRF 100 to another NRF 100 that has access to different information (e.g., an NRF 100 in a different region) until either the service request can be serviced or until all NRFs having access to different information has received the service request.

Referring to FIG. 4, in step 401, a service request (e.g., an NF discovery request) may be sent from consumer NF 400 to NRF A1 100. For example, NRF A1 100 may represent one of multiple NRFs 100 in PLMN 300 or a region thereof.

In step 402, NRF A1 100 may receive the service request, determine that it cannot service the service request (e.g., cannot provide a successful response), and then forward the service request to NRF B1 100.

In step 403, NRF B1 100 may receive the service request, determine that it cannot service the service request (e.g., cannot provide a successful response), and then forward the service request to NRF C1 100.

In step 404, NRF C1 100 may receive the service request, determine that it cannot service the service request (e.g., cannot provide a successful response), and then forward the service request to NRF D1 100.

In step 405, NRF D1 100 may generate and forward or send a service response associated with the service request to NRF C1 100.

In some embodiments, NRF D1 100 may generate a service response because NRF D1 100 can service the message, e.g., provide an NF profile or other requested information. In such embodiments where the service request can be serviced by the last NRF (e.g., NRF D1 100), the service response may include or indicate requested information and/or a successful outcome In some embodiments, NRF D1 100 may generate a service response after determining it cannot service the service request (e.g., cannot provide a successful response) but that there are no other NRFs 100 to forward the service request to. In such embodiments where the service request cannot be serviced by the last NRF (e.g., NRF D1 100), the service response may include an error indicating that the service request cannot be serviced.

In step 406, the service response may be forwarded or sent from NRF C1 100 to NRF B1 100.

In step 407, the service response may be forwarded or sent from NRF B1 100 to NRF A1 100.

In step 408, the service response may be forwarded or sent from NRF A1 100 to consumer NF 400.

In some embodiments, e.g., as depicted in FIG. 4, consumer NF 400 may be configured to utilize timers or other mechanisms for determining whether a transaction timeout (e.g., a request timeout) occurs. For example, consumer NF 400 may be configured to expect a service response within 45 milliseconds of sending a service request, and, if a service response is not received within that time period, then consumer NF 400 may deem a transaction timeout to have occurred. In this example, after a transaction timeout, consumer NF 400 may treat received service responses associated with the service request as stale and may reject, discard, or ignore the stale responses.

In some embodiments, unregulated or limitless NRF forwarding may result in a transaction timeout (e.g., at consumer NF 400) occurring before a service response is received. In such embodiments, this scenario may result in a service impact because even if a successful service response is received after the timeout consumer NF 400 may reject, discard, or ignore the service response as stale.

It will be appreciated that FIG. 4 is for illustrative purposes and that different and/or additional messages and/or actions may be used. It will also be appreciated that various messages and/or actions described herein may occur in a different order or sequence.

Figure 5:
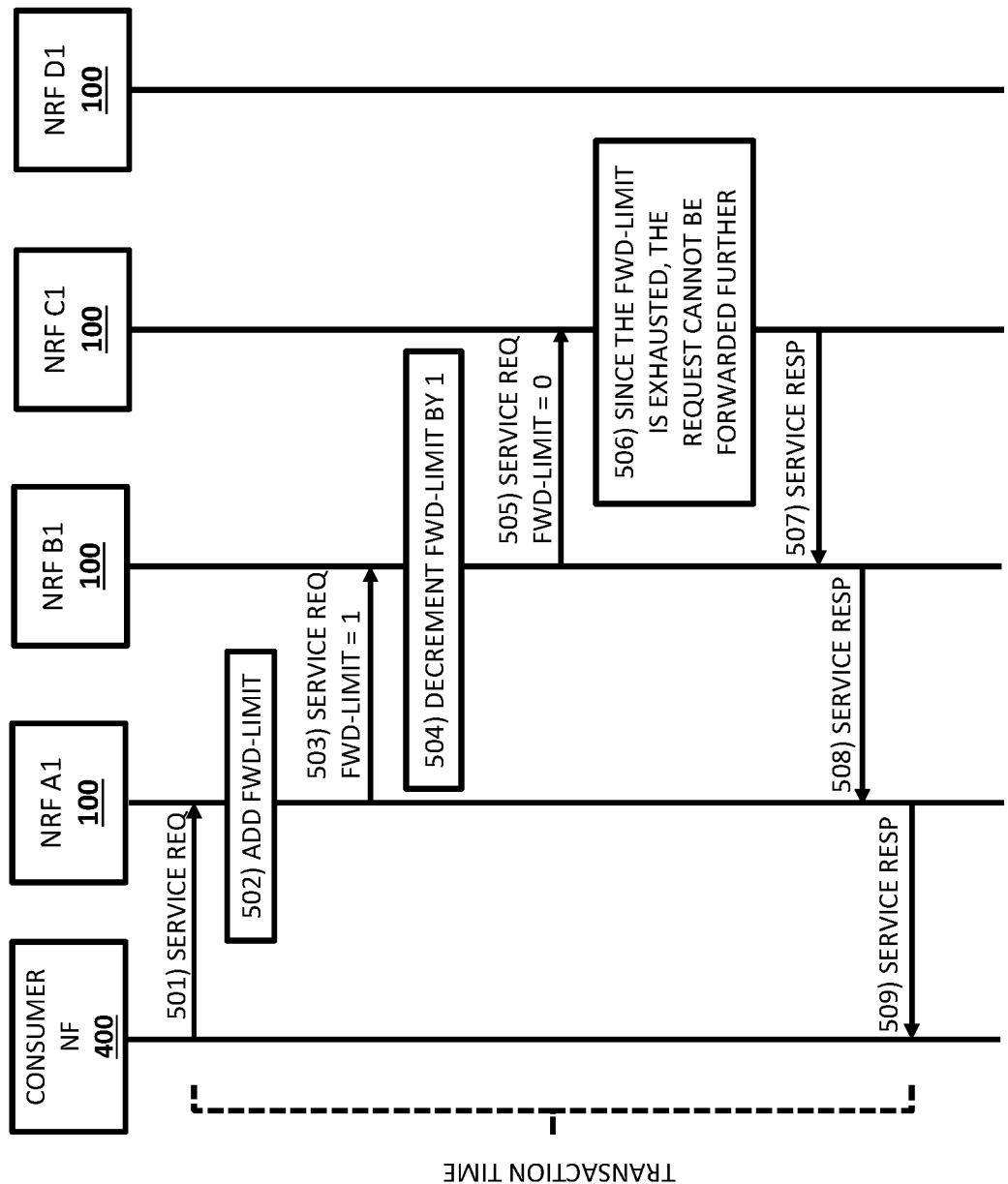
FIG. 5 is a message flow diagram illustrating a scenario involving an NRF inserting a forwarding limit value in a request message.

FIG. 5 is a message flow diagram illustrating a scenario involving NRF A1 100 inserting a forwarding limit value in a request message. In some embodiments, consumer NF 400 may send a service request (e.g., NF discovery request) to NRF A1 100. In some embodiments, NRF A1 100 (e.g., comprising FLM 204) may support NRF forwarding limits. In some embodiments, prior to forwarding a service request to NRF B1 100, if the service request lacks a forwarding limit value (e.g., a custom HTTP header parameter value or a payload IE), NRF A1 100 may determine an appropriate forwarding limit value, then insert the forwarding limit value in the service request and then forward the service request to NRF B1 100. In some embodiments, prior to forwarding a service request to NRF B1 100, if the service request already includes a forwarding limit value (e.g., a custom HTTP header parameter value or a payload IE), NRF A1 100 may decrement the forwarding limit value by one and then forward the service request to NRF B1 100.

Referring to FIG. 5, in step 501, a service request (e.g., an NF discovery request) may be sent from consumer NF 400 to NRF A1 100. For example, NRF A1 100 may represent one of multiple NRFs 101 in PLMN 300 or a region thereof.

In step 502, if the service request lacks a forwarding limit value, NRF A1 100 may determine an appropriate initial forwarding limit value and then insert the forwarding limit value (e.g., FWD-LIMIT=2) or derivation thereof (e.g., the value decremented by one, FWD-LIMIT=1) in the service request. For example, NRF A1 100 may query a data store containing various default or predetermined forwarding limit values using a forwarding limit configuration or operational mode and/or other data to obtain an appropriate forwarding limit value.

In step 503, the service request including the forwarding limit value (e.g., FWD-LIMIT=1) may be forwarded to NRF B1 100.

In step 504, NRF B1 100 may receive the service request, determine that it cannot service the service request (e.g., cannot provide a successful response), determine that the service request can be forwarded, and decrement by one the forwarding limit value (e.g., from FWD-LIMIT=1 to FWD-LIMIT=0) in the service request.

In step 505, the service request including the updated forwarding limit value (e.g., FWD-LIMIT=0) may be forwarded to NRF C1 100.

In step 506, NRF C1 100 may receive the service request, determine that it cannot service the service request (e.g., cannot provide a successful response), determine that the service request cannot be forwarded because the forwarding limit is zero and no further forwarding is allowed, and may generate a service response with an appropriate error (instead of forwarding the service request to NRF C1 100).

In step 507, the service response may be forwarded or sent from NRF C1 100 to NRF B1 100.

In step 508, the service response may be forwarded or sent from NRF B1 100 to NRF A1 100.

In step 509, the service response may be forwarded or sent from NRF A1 100 to consumer NF 400.

In some embodiments, responsive to receiving the service response, consumer NF 400 may retry or reroute the service request (e.g., based on an operator's policy), thereby reducing network errors and service impacts associated with stale responses caused by unmanaged NRF forwarding.

It will be appreciated that FIG. 5 is for illustrative purposes and that different and/or additional messages and/or actions may be used. It will also be appreciated that various messages and/or actions described herein may occur in a different order or sequence.

Figure 6:
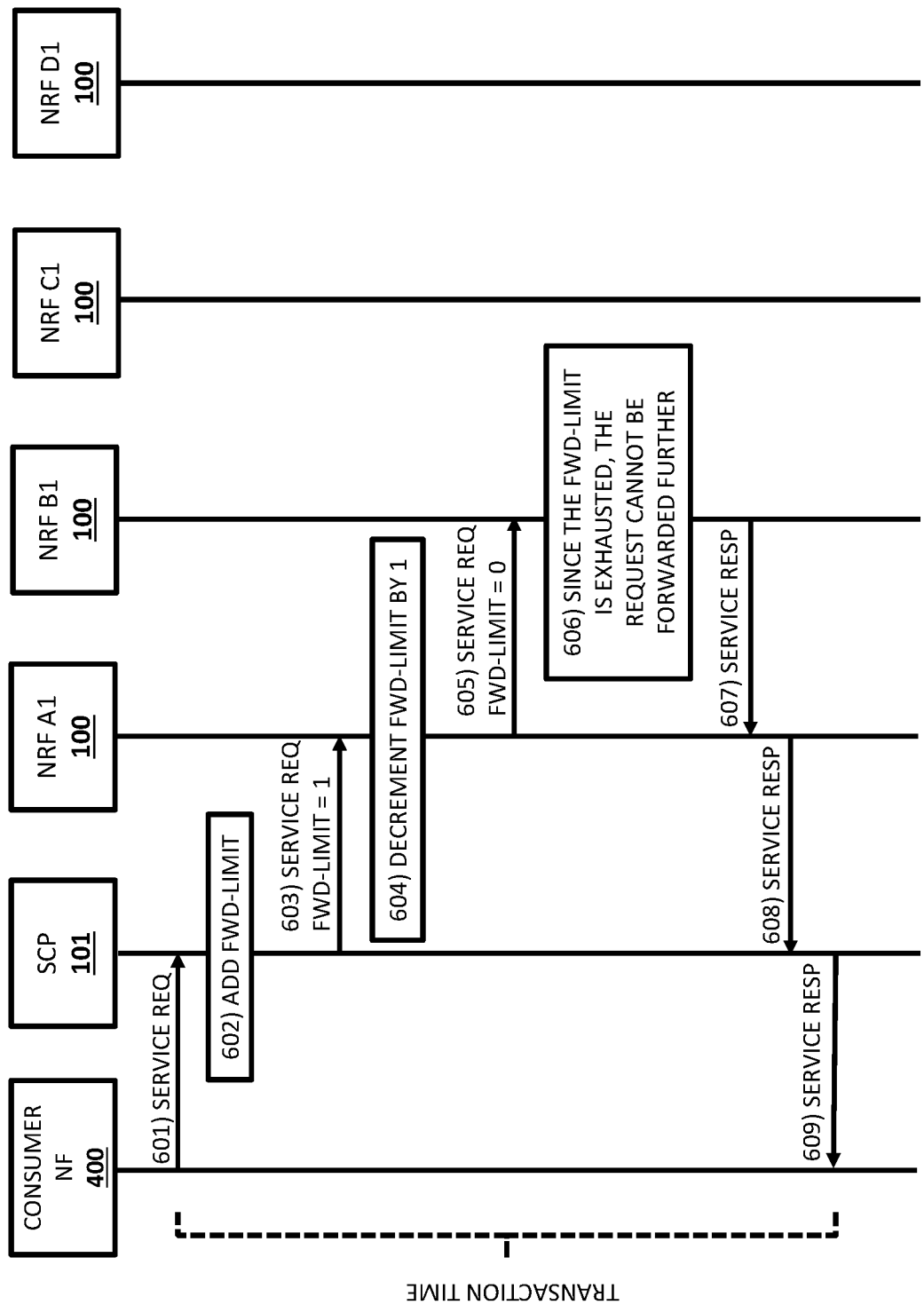
FIG. 6 is a message flow diagram illustrating a scenario involving a service communications proxy (SCP) inserting a forwarding limit value in a request message.

FIG. 6 is a message flow diagram illustrating a scenario involving SCP 101 inserting a forwarding limit value in a request message. In some embodiments, consumer NF 400 may send a service request (e.g., an NF discovery request) to NRF A1 100 via SCP 101. In such embodiments, this communication mode or related setup may be associated with an indirect inter-PLMN communication model referred to as Model C in various 3GPP 5G standards. In some embodiments, SCP 101 (e.g., comprising FLM 204) may support NRF forwarding limits. In some embodiments, prior to forwarding a service request to NRF 100, if the service request lacks a forwarding limit value (e.g., a custom HTTP header parameter value or a payload IE), SCP 101 may determine an appropriate forwarding limit value, then insert the forwarding limit value in the service request and then forward the service request to NRF 100. In some embodiments, prior to forwarding a service request to NRF 100, if the service request already includes a forwarding limit value (e.g., a custom HTTP header parameter value or a payload IE), SCP 101 may decrement the forwarding limit value by one and then forward the service request to NRF 100.

Referring to FIG. 6, in step 601, a service request (e.g., an NF discovery request) may be sent from consumer NF 400 to V-SCP 101. For example, V-SCP 101 may represent one of multiple SCPs 101 in PLMN 300 or a region thereof.

In step 602, SCP 101 may identify that the service request is to be sent to NRF A1 100 and, as such, may determine an appropriate initial forwarding limit value and then insert the forwarding limit value (e.g., FWD-LIMIT=2) or derivation thereof (e.g., the value decremented by one, FWD-LIMIT=1) in the service request. For example, SCP 101 may query a data store containing various default or predetermined forwarding limit values using a forwarding limit configuration or operational mode and/or other data to obtain an appropriate forwarding limit value.

In step 603, the service request including the forwarding limit value (e.g., FWD-LIMIT=1) may be forwarded to NRF A1 100.

In step 604, NRF A1 100 may receive the service request, determine that it cannot service the service request (e.g., cannot provide a successful response), determine that the service request can be forwarded, and decrement by one the forwarding limit value (e.g., from FWD-LIMIT=1 to FWD-LIMIT=0) in the service request.

In step 605, the service request including the updated forwarding limit value (e.g., FWD-LIMIT=0) may be forwarded to NRF B1 100.

In step 606, NRF B1 100 may receive the service request, determine that it cannot service the service request (e.g., cannot provide a successful response), determine that the service request cannot be forwarded because the forwarding limit is zero and no further forwarding is allowed, and may generate a service response with an appropriate error (instead of forwarding the service request to NRF C1 100).

In step 607, the service response may be forwarded or sent from NRF B1 100 to NRF A1 100.

In step 608, the service response may be forwarded or sent from NRF A1 100 to SCP 101.

In step 609, the service response may be forwarded or sent from SCP 101 to consumer NF 400.

In some embodiments, responsive to receiving the service response, consumer NF 400 may retry or reroute the service request (e.g., based on an operator's policy), thereby reducing network errors and service impacts associated with stale responses caused by unmanaged NRF forwarding.

It will be appreciated that FIG. 6 is for illustrative purposes and that different and/or additional messages and/or actions may be used. It will also be appreciated that various messages and/or actions described herein may occur in a different order or sequence.

FIG. 7 depicts example forwarding limit data 700 usable for determining a default or initial forwarding limit value. For example, when a forwarding limit value is lacking from a received request message, NF 200 (e.g., NRF 100 or SCP 101) may use service request characteristics, NF configuration information, and/or other data to identify a relevant forwarding limit value to add to the received request message, e.g., before forwarding to another NF. In some embodiments, forwarding limit data 700 may be stored in one or more data structures (e.g., one or more data stores) in data storage 206 or another storage device at one or more NFs (e.g., NRFs 100 and/or SCPs 101).

Referring to FIG. 7, forwarding limit data 700 may be depicted as a data table containing multiple columns, where each row represents an association or mapping between a configuration and/or operational mode, a lookup and/or match key, and a forwarding limit value.

A "configuration/operational mode" column may indicate the configuration and/or operational mode (e.g., of the NF) associated with supporting NRF forwarding limits. Example data in the "configuration/operational mode" column may indicate an identifier (e.g., a value or name) for indicating one of a plurality of different modes (e.g., "system wide", "NF type based", "NF instance based", etc.) associated with managing forwarding limits. For example, a "system wide" configuration may represent a mode where NF 200 provides a same forwarding limit value for any service request or may represent a base forwarding limit that can be used for a service request unless the service request or related information matches a different entry having a different forwarding limit value). In another example, "NF type based" configuration may a represent mode where NF 200 provides a forwarding limit value for a service request based on the requesting NF (e.g., consumer NF 400) and/or a requested NF (e.g., NEF 118, PCF 102, AF 106, etc.) associated with the service request. In another example, "NF instance based" configuration may represent a mode where NF 200 provides a forwarding limit value for a service request based on the requesting NF instance ID (e.g., NF instance ID of consumer NF 400) and/or a requested NF instance ID (e.g., NF instance ID of AF 106) associated with the service request.

In some embodiments, if a service request matches multiple data entries corresponding to different forwarding limit values, NF 200 may use selection logic to select the appropriate forwarding limit value for that service request. For example, in some embodiments, data entries may have a priority or precedence associated with them. In this example, assuming the data entries priority order (from highest priority to lowest) is "NF instance based" data entries, "NF type based" data entries, and "system wide" data entries. Continuing with this example, since a "system wide" data entry may be match any or all service request, NF 200 may use the corresponding forwarding limit value of the "system wide" data entry only if no other data entry is matched. In another example, where service request matches multiple data entries corresponding to different forwarding limit values, NF 200 may use the lowest or highest forwarding limit value of one of the matching data entries, or may use a forwarding limit value that is derived from two or more matching data entries, e.g., an average of their forwarding limit values.

A "lookup and/or match key" column may indicate information or criteria usable for determining whether a service request matches a given data entry. Example data in the "lookup and/or match key" column may represent a particular value or identifier that a service request or data therein must match or equal to match the data entry (and corresponding forwarding limit value). For example, "*" may indicate that any service request will match the data entry. In another example, "AF" may indicate that any service request from or for an AF (e.g., AF 106) will match the data entry. In another example, "NEF" may indicate that any service request from or for an NEF (e.g., NEF 118) will match the data entry. In another example, "NF ID 1" may indicate that any service request from or for an particular NF instance identified by "NF ID 1" (e.g., a universally unique identifier (UUID)) will match the data entry. In another example, "NF ID 2" may indicate that any service request from or for an particular NF instance identified by "NF ID 2" (e.g., a UUID) will match the data entry.

In some embodiments, forwarding limit values may be indexed or otherwise determinable using one or more factors. For example, forwarding limit values for a given Nnrf service request (e.g., an NF discovery request) may be determined using the NF Type of the NF discovery requester (e.g., consumer NF 400), the NF type of the requested or target NF (e.g., producer NF 306), and NF 200's forwarding limit operational mode (e.g., "NF type based" configuration) . In another example, forwarding limit values for a given Nnrf service request (e.g., an NF discovery request) may be determined using the NF instance ID of the NF discovery requester (e.g., consumer NF 400, and NF 200's forwarding limit operational mode (e.g., "NF instance based" configuration).

In some embodiments, a network operator may provision or provide forwarding limit data 700 or portion(s) thereof at various times, e.g., an initialization time, dynamically (e.g., when SLAs are modified or renewed, based on network conditions, etc.), and/or periodically (e.g., daily, every 3 hours, etc.). For example, when an SLA is entered between two PLMNs, a network operator may provide or indicate associations between forwarding limit values and one or more configuration or operational modes.

It will be appreciated that forwarding limit data 700 is for illustrative purposes and that different and/or additional data than the data depicted in FIG. 7 may be usable for determining forwarding limit values.

Figure 8:
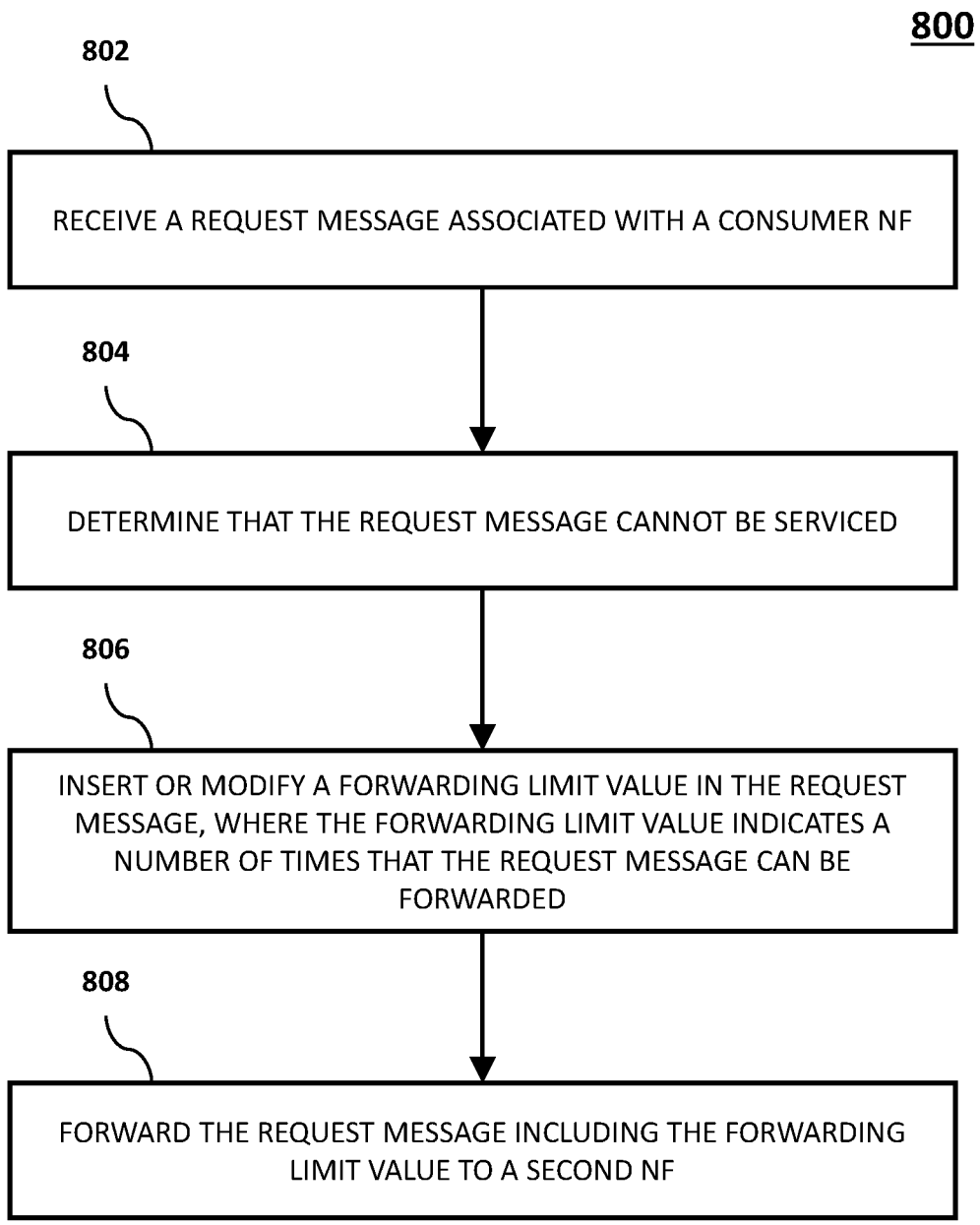
FIG. 8 is a flow chart illustrating an example process for limiting NRF forwarding.

FIG. 8 is a diagram illustrating an example process 800 for limiting NRF forwarding. In some embodiments, example process 800 described herein, or portions (e.g., steps) thereof, may be performed at or performed by NF 200, NRF 100, SCP 101, and/or another module, NF, or node.

Referring to process 800, in step 802, a request message associated with a consumer NF may be received. In some embodiments, the request message may include an Nnrf service request, a service-based interface (SBI) request, an NF discovery request, an NF subscription request, or an NF access token request.

In step 804, it may be determined that the request message cannot be serviced by the first NF. For example, assuming that a request message is an NF discovery request for a particular NF type, NRF A1 100 may receive the request message and determine that it does not know any NF instances that would meet the criteria of the NFN discovery request. In this example, NRF A1 100 may determine that NRF B1 100 (e.g., an NRF in a different region) may have registration information of additional or different NFs and/or that NRF B1 100 could potentially service the NF discovery request.

In step 806, a forwarding limit value may be inserted or modified in the request message, where the forwarding limit value indicates a number of times that the request message can be forwarded. In some embodiments, the forwarding limit value may be in a header of the request message, in a payload of the request message, in a hypertext transfer protocol (HTTP) header of the request message, or in an information element (IE) in a payload of the request message.

In some embodiments (e.g., where a received request message lacks a forwarding limit value), inserting the forwarding limit value in the request message may comprise determining that the request message lacks the forwarding limit value; determining, using a data store containing forwarding limit operational modes and corresponding predetermined forwarding limit values, a predetermined forwarding limit value; and inserting, in the request message, the predetermined forwarding limit value or the predetermined forwarding limit value decremented by one.

In some embodiments (e.g., where a received request message already includes a forwarding limit value), an NF (e.g., NRF A1 100) may replace or modify the forwarding limit value by decrementing the existing value by one, e.g., if the forwarding limit value was two, the NF may change the forwarding limit value to one before the request message is forwarded to another NF.

In step 808, the request message including the forwarding limit value may be forwarded toward a second NF.

In some embodiments, the second NF (e.g., NRF B1 100) may be configured for receiving the request message including the forwarding limit value; determining that the request message cannot be serviced by the second NF; determining, using the forwarding limit value, that the request message can be forwarded; decrementing by one the forwarding limit value in the request message; and forwarding the request message with the forwarding limit value toward a third NF.

In some embodiments, the third NF (e.g., NRF C1 100) may be configured for receiving the request message including the forwarding limit value; determining that the request message cannot be serviced by the third NF; determining, using the forwarding limit value, that the request message cannot be forwarded; generating a response message indicating an error or a failure; and sending the response message.

In some embodiments, determining that the request message cannot be forwarded may include determining that the forwarding limit value is zero or that the forwarding limit value indicates that the request message cannot be forwarded.

In some embodiments, the forwarding limit value may be in a header of the request message, in a payload of the request message, in a hypertext transfer protocol (HTTP) header of the request message, or in an information element (IE) in a payload of the request message.

In some embodiments, inserting the forwarding limit value in the request message may comprise determining that the request message lacks the forwarding limit value; determining, using a data store containing forwarding limit operational modes and corresponding predetermined forwarding limit values, a predetermined forwarding limit value; and inserting, in the request message, the predetermined forwarding limit value or the predetermined forwarding limit value decremented by one.

In some embodiments, the forwarding limit operational modes may include a system wide forwarding limit mode, an NF type based forwarding limit mode, or an NF instance based forwarding limit mode.

In some embodiments, the first NF may include a SCP (e.g., a visited or home SCP) or a NRF (e.g., a visited or home NRF).

In some embodiments, the second NF may include a visited NRF or a home NRF.

It will be appreciated that process 800 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that allows or utilizes forwarding of service requests between NFs may use features, mechanisms and techniques described herein to perform or facilitate efficient request transaction (e.g., by limiting or managing the number of times service requests can be forwarded), thereby reducing issues (e.g., network errors and service outages) associated with transaction or request timeouts and/or stale responses.

It should be noted that NF 200, FLM 204, and/or functionality described herein may constitute a special purpose computing device. Further, NF 200, FLM 204, and/or functionality described herein can improve the technological field of network communications. For example, NF 200 may include FLM 204 and may be capable of supporting NRF forwarding limits. In this example, NF 200 and/or FLM 204 may regulate forwarding of Nnrf service requests by using a forwarding limit value that is decremented and then propagated with the service request when the service request is forwarded from one NRF 100 to another NRF 100. Continuing with this example, the forwarding limit value in the service request can inform NRFs 100 when deciding whether a service request needs to be forwarded or should be responded to, e.g., with an error response when the forwarding limit is reached and the service request cannot be serviced.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.501; 3rd Generation Partnership Project; Technical Specification Group Services and System Aspects; System architecture for the 5G System (5GS); Stage 3 (Release 17); V17.2.0 (2021-06).
2. 3GPP TS 29.510; 3rd Generation Partnership Project; Technical Specification Group Core Network and Terminals; 5G System; Network Function Repository Services; Stage 3 (Release 17); V17.2.0 (2021-06).
3. 3GPP TS 29.500; 3rd Generation Partnership Project; Technical Specification Group Core Network and Terminals; 5G System; Technical Realization of Service Based Architecture; Stage 3 (Release 17); V17.3.0 (2021-06).
4. 3GPP TS 29.573; 3rd Generation Partnership Project; Technical Specification Group Core Network and Terminals; 5G System; Public Land Mobile Network (PLMN) Interconnection; Stage 3 (Release 17); V17.1.0 (2021-06).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for limiting network function (NF) repository function (NRF) forwarding, the method comprising:
at a first network function (NF) comprising at least one processor:
receiving a request message associated with a consumer NF, wherein the request message lacks a forwarding limit value;
determining that the request message cannot be serviced by the first NF;
inserting a forwarding limit value in the request message, wherein the forwarding limit value indicates a number of times that the request message can be forwarded, wherein inserting the forwarding limit value in the request message comprises: determining that the request message lacks the forwarding limit value; determining, using a data store containing forwarding limit operational modes and corresponding predetermined forwarding limit values, a predetermined forwarding limit value by performing a lookup in the data store using an NF type or an NF instance associated with the request message, wherein the forwarding limit operational modes include a system wide forwarding limit mode, an NF type based forwarding limit mode, and an NF instance based forwarding limit mode; and inserting, in the request message, the predetermined forwarding limit value or the predetermined forwarding limit value decremented by one; and
forwarding the request message including the forwarding limit value toward a second NF.

2. The method of claim 1 comprising:
at the second NF:
receiving the request message including the forwarding limit value;
determining that the request message cannot be serviced by the second NF;
determining, using the forwarding limit value, that the request message can be forwarded;
decrementing by one the forwarding limit value in the request message; and
forwarding the request message with the forwarding limit value toward a third NF.

3. The method of claim 2 comprising:
at a third NF:
receiving the request message including the forwarding limit value;
determining that the request message cannot be serviced by the third NF;
determining, using the forwarding limit value, that the request message cannot be forwarded;
generating a response message indicating an error or a failure; and
sending the response message.

4. The method of claim 3 wherein determining that the request message cannot be forwarded includes determining that the forwarding limit value is zero or that the forwarding limit value indicates that the request message cannot be forwarded.

5. The method of claim 1 wherein the forwarding limit value is in a header of the request message, in a payload of the request message, in a hypertext transfer protocol (HTTP) header of the request message, or in an information element (IE) in a payload of the request message.

6. The method of claim 1 wherein the first NF includes a service communication proxy (SCP) or an NF repository function (NRF).

7. The method of claim 1 wherein the second NF includes an NF repository function (NRF).

8. A system for limiting network function (NF) repository function (NRF) forwarding, the system comprising:
at least one processor;
a memory; and
a first network function (NF) implemented using the at least one processor and the memory, the first NF configured for:
receiving a request message associated with a consumer NF, wherein the request message lacks a forwarding limit value;
determining that the request message cannot be serviced by the first NF;
inserting a forwarding limit value in the request message, wherein the forwarding limit value indicates a number of times that the request message can be forwarded, wherein inserting the forwarding limit value in the request message comprises: determining that the request message lacks the forwarding limit value; determining, using a data store containing forwarding limit operational modes and corresponding predetermined forwarding limit values, a predetermined forwarding limit value by performing a lookup in the data store using an NF type or an NF instance associated with the request message, wherein the forwarding limit operational modes include a system wide forwarding limit mode, an NF type based forwarding limit mode, and an NF instance based forwarding limit mode; and inserting, in the request message, the predetermined forwarding limit value or the predetermined forwarding limit value decremented by one; and
forwarding the request message including the forwarding limit value toward a second NF.

9. The system of claim 8 comprising:
the second NF, wherein the second NF is configured for:
receiving the request message including the forwarding limit value;
determining that the request message cannot be serviced by the second NF;
determining, using the forwarding limit value, that the request message can be forwarded;
decrementing by one the forwarding limit value in the request message; and
forwarding the request message with the forwarding limit value toward a third NF.

10. The system of claim 9 comprising:
the third NF, wherein the third NF is configured for:
receiving the request message including the forwarding limit value;
determining that the request message cannot be serviced by the third NF;
determining, using the forwarding limit value, that the request message cannot be forwarded;
generating a response message indicating an error or a failure; and
sending the response message.

11. The system of claim 10 wherein the first NF is configured for determining that the request message cannot be forwarded by determining that the forwarding limit value is zero or that the forwarding limit value indicates that the request message cannot be forwarded.

12. The system of claim 8 wherein the forwarding limit value is in a header of the request message, in a payload of the request message, in a hypertext transfer protocol (HTTP) header of the request message, or in an information element (IE) in a payload of the request message.

13. The system of claim 8 wherein the request message may include an Nnrf service request, a service-based interface (SBI) request, an NF discovery request, an NF subscription request, or an NF access token request.

14. The system of claim 8 wherein the first NF includes a service communication proxy (SCP) or an NF repository function (NRF).

15. The system of claim 8 wherein the second NF includes an NF repository function (NRF).

16. A non-transitory computer readable medium having stored thereon executable instructions that when executed by at least one processor of a computer cause the computer to perform steps comprising:
at a first network function (NF) comprising at least one processor:
receiving a request message associated with a consumer NF, wherein the request message lacks a forwarding limit value;
determining that the request message cannot be serviced by the first NF;
inserting a forwarding limit value in the request message, wherein the forwarding limit value indicates a number of times that the request message can be forwarded, wherein inserting the forwarding limit value in the request message comprises: determining that the request message lacks the forwarding limit value; determining, using a data store containing forwarding limit operational modes and corresponding predetermined forwarding limit values, a predetermined forwarding limit value by performing a lookup in the data store using an NF type or an NF instance associated with the request message, wherein the forwarding limit operational modes include a system wide forwarding limit mode, an NF type based forwarding limit mode, and an NF instance based forwarding limit mode; and
inserting, in the request message, the predetermined forwarding limit value or the predetermined forwarding limit value decremented by one; and forwarding the request message including the forwarding limit value toward a second NF.

\* \* \* \* \*